Nov. 16, 1965 M. DE HAZE WINKELMAN 3,218,394

RINGBACK SIGNALING CIRCUIT

Filed June 15, 1962 2 Sheets-Sheet 1

INVENTOR
M. de HAZE WINKELMAN
BY Donald M. Swift
ATTORNEY

Nov. 16, 1965 M. DE HAZE WINKELMAN 3,218,394

RINGBACK SIGNALING CIRCUIT

Filed June 15, 1962 2 Sheets-Sheet 2

INVENTOR
M. de HAZE WINKELMAN
BY Donald M. Duft
ATTORNEY 3,218,394
RINGBACK SIGNALING CIRCUIT
Max de Haze Winkelman, Columbus, Ohio, assignor to Bell Telephone Laboratories, Incorporated, New York, N.Y., a corporation of New York
Filed June 15, 1962, Ser. No. 202,750
11 Claims. (Cl. 179—18)

Figures 1, 3:
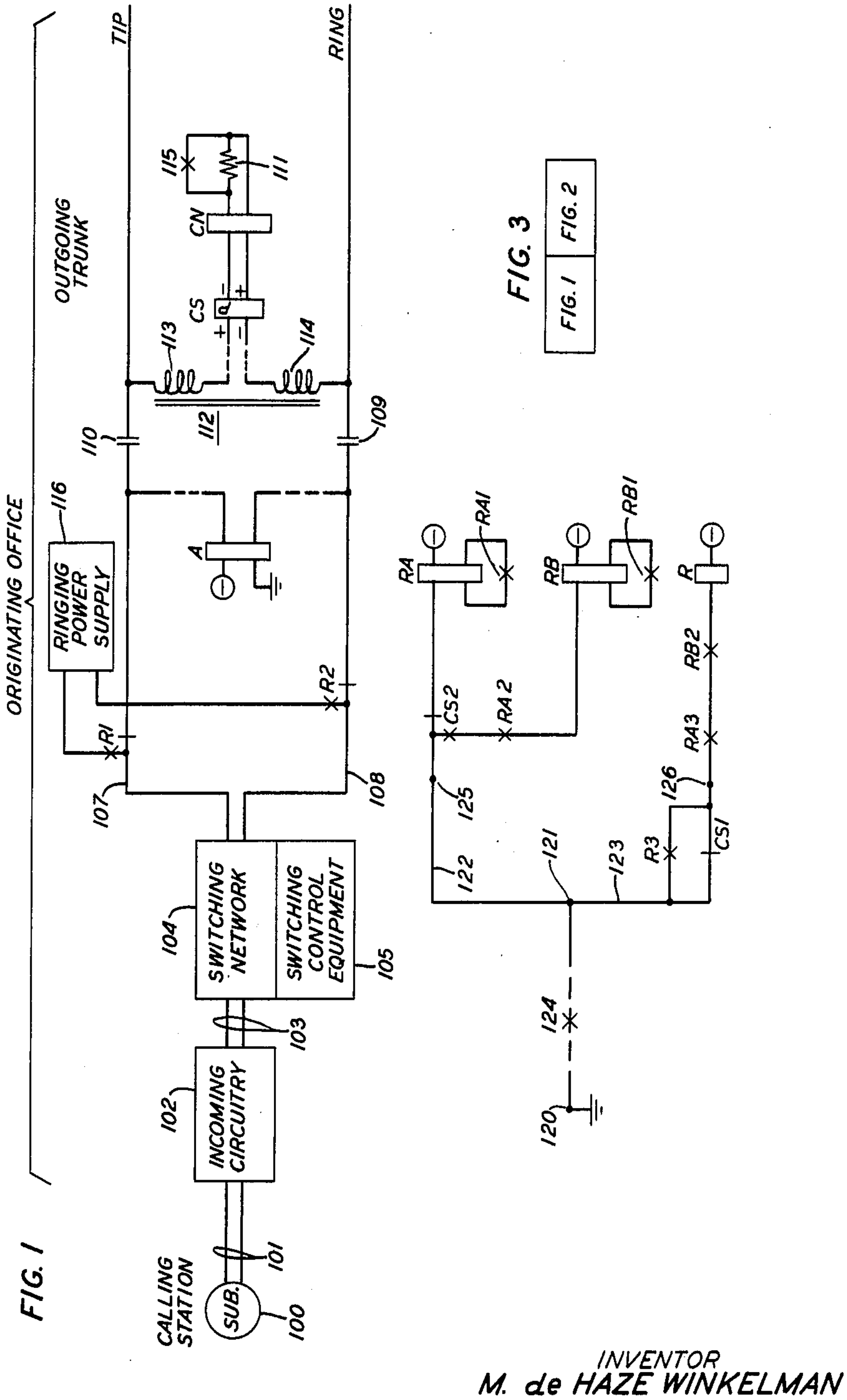

This invention relates to a signaling circuit and more particularly to a signaling circuit which may be used in a telephone switching system to enable a distant office to control a ringback operation or the like in an originating office.

Ringback operations are used in telephone switching systems to notify a calling party that a call previously placed or attempted by him is ready for completion. Ringback operations in multioffice connections are usually controlled by a tandem or terminating office when it determines that the called circuit is available. It is not expedient in multioffice connections to transmit ringing current between offices because of the distances involved. Therefore, it has long been common practice in connection with ringback operations to have the originating office apply ringing current to the calling circuit in response to its reception of a special D.-C. control signal, such as a single trunk reversal, a momentary trunk opening, etc., from the distant office. The use of control signals for this function is advantageous since it permits the ringback operation to be controlled with a minimum of signaling equipment and with the same ringing power that is required on a local connection.

A new type of ringback control signal is currently required in systems providing such direct distance dialing services as person-to-person, collect, charge to a third party, and coin phone direct distance dialing since all of the aforementioned commonly known types of D.-C. signals in these systems will be used for other purposes such as coin collection, coin refund, etc. Although a new method of ringback signaling is desired, the more obvious expedients such as MF signaling, etc. cannot be used due to the expense of the required equipment.

It is therefore an object of the invention to provide an improved ringback control circuit.

It is a further object of the invention to provide an improved ringback control circuit whereby a distant office may control the application of ringing current to a calling circuit at an originating office.

It is a further object of the invention to provide an improved and inexpensive signaling circuit whereby a distant office may transmit ringback control signals to an originating office by means of circuitry which requires a minimum of modification of the existing equipment at both offices.

In accordance with the present invention, each incoming trunk circuit at a distant office is provided with facilities for selectively and continuously reversing the polarities of its incoming tip and ring conductors extending back to an originating office. The polarity reversing facilities are energized by the distant office whenever it desires to initiate a ringback operation at an originating office. The originating office is provided with facilities for detecting the continuing polarity reversals on any one of its outgoing trunks; and, in response thereto, for operating a control relay which, when operated applies ringing current to the calling circuit to which the outgoing trunk is connected.

With the foregoing arrangement, it may be seen that once the progress of a call in a distant office advances to the point where, as determined by the distant office, ringing current should be applied to the calling line, the ringback control circuitry at the distant office is actuated to reverse repeatedly the polarity of the calling incoming trunk at a controlled rate. These polarity reversals are transmitted over the trunk to the originating office where they are detected by the equipment provided in accordance with the present invention. This detection equipment, in turn, causes ringing current to be applied to the calling circuit as long as the polarity reversals persist. The termination of the polarity reversal operation at the distant office releases the detection equipment in the local office and removes the ringing current from the line.

The ringback signaling arrangement of the present invention is advantageous in that (1) it requires a minimum of modification of the existing circuitry in both the originating and distant offices; (2) the required modifications are inexpensive due to the relative simplicity thereof; and (3) the required modifications do not impair the ability of the trunks to transmit other types of signals and therefore, the current signaling arrangements which are used for other control functions may continue to be used after the circuitry of the present invention is added to the existing circuits.

A feature of the invention is the provision of equipment at a distant offiec for applying a continuing series of polarity reversals to an incoming trunk in order to control a ringback operation at the office terminating the other end of said trunk.

A further feature of the invention is the provision of trunk polarity reversal equipment at a distant office and trunk polarity reversal detection equipment at an originating office for applying ringing current to a calling circuit at the originating office whenever the polarity reversal equipment is operative.

A further feature of the invention is the provision of polarity reversal detection means in an outgoing trunk circuit for controlling the application of ringing current to a calling line whenever the polarity of the outgoing trunk is reversed at a predetermined rate.

Figure 2:
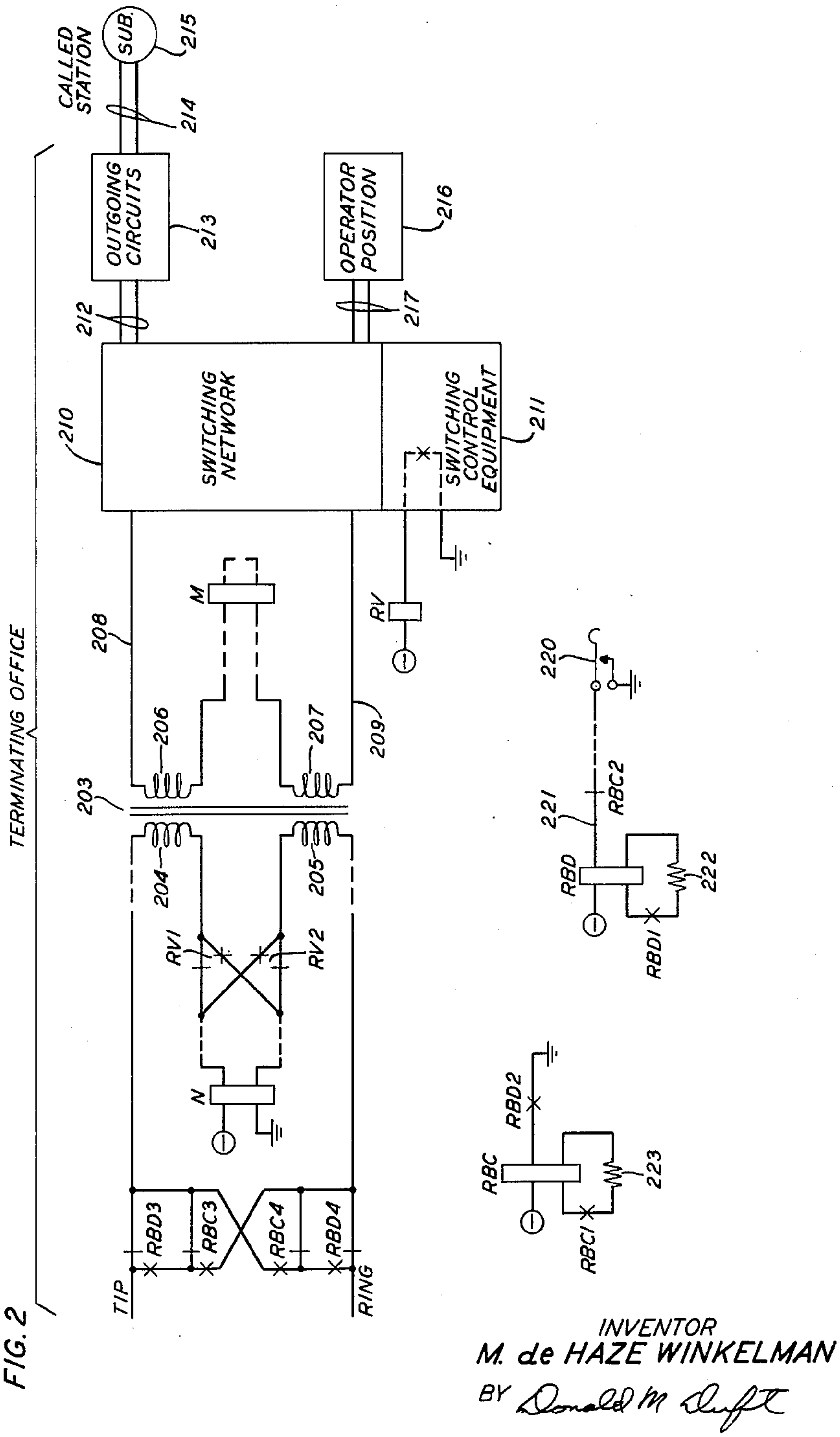

These and other objects and features of the invention will become apparent from a reading of the following description of the invention taken in conjunction with the drawing, in which:

FIG. 1 discloses an originating office, partially in diagrammatic form, together with the details of the trunk polarity reversal detection and ringback control circuitry of the present invention;

FIG. 2 discloses a distant office, partially in diagrammatic form, together with the trunk polarity reversal control circuitry of the present invention; and FIG. 3 discloses the manner in which FIGS. 1 and 2 should be arranged with respect to each other.

Relay contacts are shown detached from their associated windings on the drawings. Contacts which are closed when a relay is operated (make contacts) are represented by an X crossing the lines representing the connecting conductors while contacts which open when a relay is operated (break contacts) are represented by a short line intersecting the connecting conductors. The winding of each relay is designated by a alphabetical character, such as relay RA, for example, while the contacts associated with the relay are designated with the alphabetical designation of the controlling winding followed by a numerical designation individual to each contact, such as contacts RA1 and RA2, for example.

FIG. 1 discloses a calling station 100 connected via a conductor pair 101 to the incoming circuitry portion 102 of an originating office. The incoming circuitry 102 is connected by a conductor pair 103 to the office switching network 104 which may be controlled by the switching control equipment 105. The switching network 104 is, in turn, connected by conductors 107 and 108 to the outgoing trunk portion of the office.

The outgoing trunk includes a relay A which is typically provided for supplying talking battery to the calling connection. Conductor 107 is connected by capacitor 110 to the outgoing trunk tip conductor while conductor 108 is connected by capacitor 109 to the outgoing trunk ring conductor. The tip and ring conductors are shunted by a dry loop comprising winding 113 of retard coil 112, the upper winding of polarized relay CS, the upper and lower windings of relay CN, the lower winding of polarized relay CS and winding 114 of retard coil 112. Relay CN is typically included in outgoing trunk circuits to control operations not associated with the present invention. As one of its functions, it provides an indication of when the distant office is seized by operating from the increased loop current resulting from the shunting of resistor 111 as contacts 115 are closed by operating means not pertinent to my invention. Polarized relay CS is typically included in outgoing trunk circuits to monitor the battery polarities applied to the trunk by the distant office. For example, relay CS may be arranged to remain unoperated from the potentials applied to the trunk pair as a consequence of the trunk seizure and to operate only as the trunk polarity is reversed by the distant office as the call therein progresses to a predetermined stage of completion.

Relays R, RA and RB together with a contact on relay CS comprises the added equipment required in the originating office in accordance with the present invention. These relays together with relay CS detect the continuing polarity reversals applied to the trunk by the office of FIG. 2 as described in subsequent paragraphs. Relay R comprises the ringing control relay. When operated, it opens its break contacts and closes its make contacts R1 and R2 to transfer conductors 107 and 108 from the winding of the A relay to the output of the ringing power supply 116.

Relays CS and CN may comprise the facilities for receiving and detecting the other types of signals, as required, which may be transmitted from the office of FIG. 2 to that of FIG. 1. As already discussed, such signals may include single trunk reversals, momentary trunk openings, loop impedance variations, etc. The contacts of relays CS and CN and the circuitry associated with the detection of such signals are not shown on the present drawings since they comprise no part of the present invention.

FIG. 2 discloses, partially in diagrammatic form and partially in detail, a typical distant or terminating office together with the details of the trunk polarity reversing equipment added thereto in accordance with the present invention. The office comprises the incoming trunk tip and ring conductors which are connected through windings 204 and 205 of transformer 203 and through contacts RV1 and RV2 to battery and ground on the windings of relay N. Contacts RV1 and RV2 provide a means for reversing the polarity of the tip and ring conductors upon the operation of RV as an indication to the local office that the call has progressed to a certain stage of completion in the distant office. The operate circuit of relay RV is shown only diagrammatically since the specific details thereof comprise no portion of the present invention and since they would be entirely dependent upon the circuit arrangements within the office of which it is a part.

The inner terminals of secondary windings 206 and 207 of transformer 203 are connected to a dry loop comprising the two windings of relay M in series. The outer terminals of these two windings are connected by means of conductors 208 and 209 to the switching network 210 in the office which, in turn, may be controlled by the switching control equipment 211. The output of the switching network may be typically connected over conductors 212 to an outgoing circuit 213 which, in turn, may be connected over conductors 214 to a called station 215. Network 210 may also be operative to connect a call to an operator position 216 over conductors 217. The foregoing described arrangement is merely typical and, if desired, the switching network 210 could, instead, be connected by means of the outgoing circuitry to a succeeding switching center. The relays RBC and RBD together with their associated contacts comprise the equipment which must be added to the distant office to provide it with the trunk polarity reversing facilities in accordance with the present invention.

Ringback of the calling circuit is normally required, insofar as the distant office is concerned, only after the call has progressed to a certain stage of completion. For reasons which need not be discussed in detail herein, relay RV will be operated at this time as a consequence of the progress of the call. Relay RV, operated, opens its break contacts and closes its make contacts RV1 and RV2 to reverse the polarities of the tip and ring. Accordingly, ground from the lower winding of the N relay is now extended through make contacts RV1 and through winding 204 to the tip of the trunk conductor. Also, battery from the upper winding of the N relay is extended through make contacts RV2 and winding 205 to the ring conductor of the trunk. The ground on the tip conductor and the battery on the ring conductor are extended over the trunk and through the windings of transformer 112 to the windings of the polarized relay CS which now operates since the indicated polarities required for its operation are currently being applied thereto.

In partial summary so far, the operation of relay RV as the call progresses reverses the polarity of the trunk conductors and causes the operation of polarized relay CS in the local office. The call may now either proceed to completion without requiring a ringback in the local office or, alternatively, it may require a rering of the calling circuit before it can be successfully completed. If ringback is desired, the distant office may either cause make contacts 220 to be closed automatically or, alternatively, an operator at position 216 may close contacts 220 manually.

The closure of contacts 220 extends a ground to operate relay RBD. The operation of relay RBD closes its make contacts RBD2 to complete a circuit to operate RBC. Relay RBD, operated, also closes its make contacts RBD1 which, together with resistor 222 and the lower winding of relay RBD, make the relay slow in releasing. The operation of relay RBC opens its break contacts RBC2 to open the operating circuit for relay RBD. Relay RBD releases after an interval determined by its slow release characteristics. The release of relay RBD opens its make contacts RBD2 to interrupt the operating circuit for relay RBC which also releases after an interval determined by its slow release characteristics. Relay RBC, released closes its break contacts RBC2 which reclose the operating circuit for relay RBD thereby permitting it to operate, and, in turn, to reoperate RBC as contacts RBD2 reclose. The alternate operation and release of relays RBD and RBC continue in this manner so long as contacts 220 remain closed.

Contacts RBD3, RBC3, RBC4 and RBD4 reverse the polarities of the tip and ring whenever both relays RBC and RBD are operated and restore the polarities to normal when both relays are released. Thus, the tip conductor may be extended through break contacts RBD3 to winding 204 and the ring conductor may be extended through break contacts RBD4 to winding 205 when relay RBD is released. The operation of both relays RBC and RBD completes a path to connect the tip conductor through make contacts RBD3 and RBC3 to winding 205 and to connect the ring conductor through make contacts RBD4 and RBC4 to winding 204.

The polarity reversals are transmitted over the trunk to the originating office where they are detected by polarized relay CS. Relay CS, which, as already described, is operated prior to the ringback operation when ground is applied to the tip conductor and battery is applied to the ring conductor by the operation of relay RV. Relay CS follows the subsequent polarity reversals of the trunk by releasing each time the polarities are reversed, when both relays RBC and RBD are operated, and by reoperating as the polarities are returned to the so-called normal condition, when relays RBC and RBD both release. This sequential operation and release of polarized relay CS as a consequence of the trunk reversals are utilized in accordance with the present invention to control the ringback operation in the manner now described.

Referring to the circuitry associated with relays RA, RB and R on FIG. 1, a path is closed to extend the ground on terminal 120 through make contacts 124 to terminal 121 when the call in the local office has progressed to a predetermined stage of completion. At that time, the equipment (not shown) within the office completes the necessary circuit operations to close contacts 124 and interconnect terminals 120 and 121. Contacts 124 are shown independent of any specific operating means therefor since the details thereof are of no importance to the present invention and will be governed entirely by the circuitry of the system with which the present invention may be associated.

The ground on terminal 121 is extended over conductor 122 to terminal 125. As already explained, relay CS is operated at this time by the potentials applied to the trunk conductors through the make contacts of relay RV in the distant office. No further action takes place within the circuit comprising relays RA, RB and R as long as relay CS remains operated.

Let it now be assumed that the distant office desires to effect a ringback operation in the local office and, as a consequence, closes contacts 220 to cause the polarities of the trunk to be reversed continually as already described. The first trunk reversal causes relay CS to release. The release of this relay in turn closes its break contacts CS2 which extend the ground on terminal 125 to the winding of relay RA to operate it. Make contacts RA1 close at this time to make relay RA slow in releasing. The next trunk reversal restores the trunk polarity to its original condition and reoperates relay CS. The reoperation of this relay closes its make contacts CS2 which extend a path from ground on terminals 125, through make contacts CS2, through make contacts RA2 of relay RA, which is slow in releasing, to the winding of relay RB to operate it. The operation of this relay closes its make contacts RB1 so that it also will be slow in releasing. The next polarity reversal of the trunk releases relay CS. This, in turn, extends the ground on terminal 125 through break contacts CS2 to the winding of relay RA to hold it operated. This release of relay CS also extends a path from ground on terminal 121 over conductor 123, through break contacts CS1 to terminal 126. The ground on terminal 126 may now be extended through make contacts RA3 and RB2 to operate relay R since both relays RA and RB are slow to release and are now held operated.

Relay R, in operating, closes its make contacts R3 to provide a holding path for itself in series with make contacts RA3 and RB2. The next trunk reversal reoperates relay CS to re-energize the circuit for relay RB. Relay RA once more does not release for the duration of a single trunk reversal because of its slow operate feature. Both relays RA and RB remain operated by virtue of their slow release characteristics as long as the trunk reversals are received from the distant office. Consequently, make contacts RA3 and RB2 remain closed and maintain the holding path for relay R.

The operation of relay R opens its break contacts and closes its make contacts R1 and R2 to transfer conductors 107 and 108 from the winding of relay A to the output of the supply 112 which applies ringing current to the calling circuit. The distant office may provide a continuous series of trunk reversals if it wishes to effect a continuous ringing operation of the calling circuit. On the other hand, if it is desired to effect an intermittent or coded ringing operation, the distant office may apply a coded series of polarity reversals to the trunk. This will cause relay R to operate and release in accordance with the desired code and thereby apply coded ringing to the line.

The distant office may terminate the ringback operation by opening make contacts 220 to de-energize the polarity reversing circuit and restore the polarity of the trunk to its original condition whereby ground from the lower winding of relay N is applied through make contacts RV1 and winding 204 to the tip conductor and whereby battery from the top winding of relay N is applied through make contacts RV2 and winding 205 to the ring conductor. This polarity condition maintains relay CS at the local office operated. The cessation of the alternate operation and release of relay CS releases relays RA and RB. The release of these two relays releases relay R which opens its make contacts and closes its break contacts R1 and R2 to transfer conductors 107 and 108 from the ringing supply 116 back to the winding of the A relay.

It may be appreciated from the foregoing description that the present invention comprises an economical method of accomplishing a ringback operation at the local office since it requires the addition of a relatively few components at both offices. At the same time, it does not impair the present ability of the office to exchange other types of control signals such as momentary circuit openings, momentary circuit reversals, etc.

It is to be understood that the foregoing described arrangements are but illustrative of the application of the principles of the invention. Numerous other arrangements may be devised by those skilled in the art without departing from the spirit and scope of the invention. For example, my invention need not be exclusively utilized for controlling a ringback operation, but, if desired, could be utilized to permit a first location to control any type of operation that may be desired at a remote location.

What is claimed is:

1. In a telephone switching system, an originating office, a line connected to said originating office, a distant office, a trunk interconnecting said offices, controllable means at said distant office operable for reversing the polarity of said trunk at a predetermined rate, and polarity reversal detection means at said originating office operable for applying ringing current to said line in response to the operation of said polarity reversing means.

2. In a telephone switching system, an originating office, a calling circuit connected to said originating office, a distant office, a trunk interconnecting said offices, controllable means at said distant office operable for reversing the polarity of said trunk at a predetermined rate, polarity reversal detection means at said originating office operable for applying ringing current to said calling circuit in response to the operation of said polarity reversing means, and means responsive to the cessation of operation of said reversing means for disconnecting said ringing current from said calling circuit.

3. In a telephone switching system, an originating office, a line connected to said originating office, a distant office, a trunk interconnecting said offices, controllable means at said distant office operable for reversing the polarity of said trunk at a predetermined rate, a relay at said originating office connected to said trunk and operated during a first polarity condition and released during a reversed polarity condition of said trunk, and means responsive to the sequential operation and release of said relay at said predetermined rate for applying ringing current to said line.

4. In a telephone switching system, an originating office, a calling circuit connected to said originating office, a distant office, a trunk interconnecting said offices, controllable means at said distant office operable for reversing the polarity of said trunk at a predetermined rate, a relay at said originating office connected to said trunk and operated during a first polarity condition and released during a reversed polarity condition of said trunk, means responsive to the alternate operation and release of said relay at said predetermined rate for applying ringing current to said calling circuit as long as said polarity reversing means at said distant office is operable, and means responsive to the termination of operation of said reversing means for removing said ringing current from said calling circuit.

5. In a telephone switching system, an originating office, a calling line connected to said originating office, a distant office, a trunk interconnecting said offices, controllable means at said distant office operable for reversing the polarity of said trunk at a predetermined rate, a first relay at said originating office connected to said trunk and operated during a first polarity condition and released during a reversed polarity condition of said trunk, a second relay at said originating office, means responsive to the first release of said first relay as the polarity of said trunk is first reversed to operate said second relay, a third relay at said originating office, means responsive to the first reoperation of said first relay as said trunk is restored to its first polarity condition for operating said third relay, a fourth relay at said originating office, means responsive to the next release of said first relay as the polarity of said trunk is again reversed for operating said fourth relay, and means responsive to the operation of said fourth relay for applying ringing current to said line as long as said polarity reversing means at said distant office is operable.

6. In a telephone switching system, an originating office, a calling circuit connected to said originating office, a distant office, a trunk interconnecting said offices, controllable means at said distant office operable for reversing the polarity of said trunk at a predetermined rate, a first relay at said originating office connected to said trunk and operated during a first polarity condition and released during a reversed polarity condition of said trunk, a second relay at said originating office, a first set of contacts on said first relay closable upon the first release thereof as the polarity of said trunk is first reversed to operate said second relay, a first and a second set of contacts on said second relay, a third relay at said originating office, a first set of contacts on said third relay, a second set of contacts on said first relay closable upon the first reoperation thereof as said trunk is restored to its first polarity condition for operating said third relay over a circuit including said first set of contacts on said second relay, a fourth relay at said originating office, a third set of contacts on said first relay closable upon the next release thereof as the polarity of said trunk is again reversed for operating said fourth relay over a circuit including said second set of contacts on said second relay and said first set of contacts on said third relay, and means responsive to the operation of said fourth relay for applying ringing current to said calling circuit as long as said polarity reversing means at said distant office is operable.

7. In a telephone switching system, an originating office, a calling line connected to said originating office, a distant office, a trunk interconnecting said offices, controllable means at said distant office operable for reversing the polarity of said trunk at a predetermined rate, a first relay at said originating office operated during each normal polarity condition and released during each reversed polarity condition of said trunk, a second relay at said originating office, means responsive to the first release of said first relay for operating said second relay, a third relay at said originating office, means responsive to the reoperation of said first relay when said second relay is operated as the polarity of said trunk is restored to its normal condition for operating said third relay, a fourth relay at said originating office, means responsive to the concurrent operation of said second and third relays and the second release of said first relay upon the next polarity reversal of said trunk for operating said fourth relay, and means responsive to the operation of said fourth relay for applying ringing current to said calling line, said last named means being effective for disconnecting said ringing current from said line upon the cessation of said polarity reversals.

8. In a telephone switching system, an originating office, a calling line connected to said originating office, a distant office, a trunk interconnecting said offices, controllable means at said distant office operable for reversing the polarity of said trunk at a predetermined rate, a first relay at said originating office operated during a normal polarity condition and released during a reversed polarity condition of said trunk, a second relay at said originating office, contacts on said first relay closable upon the first release thereof for completing a circuit to operate said second relay, a third relay at said originating office, contacts on said first relay closable upon the subsequent reoperation thereof as the polarity of said trunk is restored to its normal condition for operating said third relay over a circuit including contacts on said second relay, a fourth relay at said originating office, contacts on said second and third relays closable upon the operation thereof for completing a circuit to operate said fourth relay upon the second release of said first relay in response to a subsequent polarity reversal of said trunk, and means responsive to the operation of said fourth relay for applying ringing current to said calling line, said last named means being effective upon the cessation of said reversals for removing said ringing current from said line.

9. In a circuit for detecting polarity reversals on a trunk extending to a remote control terminal having controllable means for reversing the polarity of said trunk at a predetermined rate, a first relay operated during a normal polarity condition and released during a reversed polarity condition of said trunk, a second relay, means responsive to the first release of said first relay for operating said second relay, a third relay, means responsive to the reoperation of said first relay while said second relay remains operated for operating said third relay, a fourth relay at said originating office, and means responsive to the operation of said second and third relays for operating said fourth relay upon the second release of said first relay.

10. In a circuit for detecting a series of polarity reversals applied to a conductor pair at a predetermined rate, a first relay operated during a normal polarity condition and released during a reversed polarity condition of said pair, a second relay, means responsive to the first release of said first relay for operating said second relay, a third relay, means responsive to the subsequent reoperation of said first relay while said second relay remains operated for operating said third relay, a fourth relay, and means responsive to the second release of said first relay when said third relay remains operated for operating said fourth relay, and means for maintaining said fourth relay operated as long as said polarity reversals continue at said predetermined rate.

11. In a circuit for detecting a series of polarity reversals applied to a conductor pair at a predetermined rate, a first relay operated during a normal polarity condition and released during a reversed polarity condition of said pair, a second relay, contacts on said first relay effective upon the first release thereof for operating said second relay, a third relay, contacts on said first relay effective upon the first reoperation thereof as the polarity of said pair is restored to its normal condition for operating said third relay over a circuit including contacts on said second relay, a fourth relay, contacts on said first, second and third relays effective upon the second release of said first relay when said polarity is again reversed for operating said fourth relay, and contacts on said second and third relays effective for maintaining said fourth relay operated as long as said polarity reversals continue at said predetermined rate.

References Cited by the Examiner

UNITED STATES PATENTS

| | | | |
|---|---|---|---|
| 1,393,502 | 10/1921 | Clausen | 179—18 |
| 2,321,412 | 6/1943 | Neiswinter | 179—18 |

ROBERT H. ROSE, *Primary Examiner.*

WALTER L. LYNDE, *Examiner.*